(12) United States Patent
Yoshitomi et al.

(10) Patent No.: US 12,242,680 B2
(45) Date of Patent: Mar. 4, 2025

(54) INFORMATION PROCESSING SYSTEM AND CONTROL METHOD

(71) Applicant: Lenovo (Singapore) Pte. Ltd., Singapore (SG)

(72) Inventors: Keiichi Yoshitomi, Kanagawa (JP); Zhouxing Wu, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/544,979

(22) Filed: Dec. 19, 2023

(65) Prior Publication Data
US 2024/0220039 A1    Jul. 4, 2024

(30) Foreign Application Priority Data
Jan. 4, 2023   (JP) ................. 2023-000173

(51) Int. Cl.
*G06F 3/038*   (2013.01)
*G06F 3/01*    (2006.01)
(Continued)

(52) U.S. Cl.
CPC ............ *G06F 3/0383* (2013.01); *G06F 3/016* (2013.01); *G06F 3/03545* (2013.01); *G06F 3/0416* (2013.01); *G06F 2203/0384* (2013.01)

(58) Field of Classification Search
CPC .... G06F 3/016; G06F 3/03545; G06F 3/0383; G06F 3/0416; G06F 3/04883; G06F 2203/0384
See application file for complete search history.

(56) References Cited

U.S. PATENT DOCUMENTS 10,007,340 B2 * 6/2018 Cruz-Hernandez ..... G06F 3/016
10,042,439 B2 * 8/2018 Varlamov ........... G06F 3/03545
(Continued)

FOREIGN PATENT DOCUMENTS

JP    2017537395 A    12/2017
JP    2018185823 A    11/2018
(Continued)

OTHER PUBLICATIONS

Extended European Search Report issued in European Application No. 23210519.7, dated Apr. 8, 2024 (9 pages).

*Primary Examiner* — Michael Pervan
(74) *Attorney, Agent, or Firm* — Osha Bergman Watanabe & Burton LLP

(57) ABSTRACT

An information processing system includes: an information processing and a pen configured to communicate with the apparatus, in which the apparatus includes a display unit configured to display a movement trace of the pen, a touch sensor unit that detects a contact position of the pen on a screen of the display unit, a display processing unit that displays, on the display unit, the movement trace of the pen based on the contact position of the pen detected by the touch sensor unit, an image transmission processing unit that transmits, to the pen, image data displayed by the display unit and including the movement trace, and a position transmission processing unit that transmits, to the pen, the contact position of the pen detected by the touch sensor unit, and the pen includes a vibration generator that outputs vibration based on a vibration waveform signal.

7 Claims, 6 Drawing Sheets

(51) Int. Cl.
    *G06F 3/0354*    (2013.01)
    *G06F 3/041*    (2006.01)

(56) References Cited

U.S. PATENT DOCUMENTS

| | | | |
|---|---|---|---|
| 10,248,213 | B2 * | 4/2019 | Cruz-Hernandez .......................... G06F 3/0488 |
| 10,620,707 | B2 * | 4/2020 | Cruz-Hernandez ..... G06T 15/04 |
| 2009/0135164 | A1 | 5/2009 | Kyung et al. |
| 2014/0139451 | A1 * | 5/2014 | Levesque ................ G06F 3/016 345/173 |
| 2015/0160729 | A1 | 6/2015 | Nakagawa |
| 2018/0081456 | A1 | 3/2018 | Li et al. |
| 2022/0365602 | A1 | 11/2022 | Dekel et al. |

FOREIGN PATENT DOCUMENTS

| | | |
|---|---|---|
| JP | 2019169166 A | 10/2019 |
| WO | 2023157556 A1 | 8/2023 |

\* cited by examiner

INFORMATION PROCESSING SYSTEM AND CONTROL METHOD

CROSS-REFERENCE TO RELATED APPLICATIONS

This application claims priority to Japanese Patent Application No. 2023-000173 filed on Jan. 4, 2023, the contents of which are hereby incorporated herein by reference in their entirety.

BACKGROUND

Technical Field

The present invention relates to an information processing system and a control method.

Description of Related Art

In recent years, an information processing system including a pen, which is an input device also called an electronic pen, a smart pen, a stylus, or the like, and an information processing apparatus such as a tablet terminal that allows handwritten input using the pen, has been known (for example, see Japanese Translation of PCT International Application Publication No. 2017-537395). In such an information processing system, a pen may be equipped with, for example, an actuator that generates vibration or the like, and vibration is generated using the pen, so that efforts are being made to reproduce the tactile sensation of actually writing on paper with the pen.

However, although complicated vibrations occur between the actual paper and the pen, the reproduction of the tactile sensation has been insufficient in the conventional information processing system as described above. For example, when the pen crosses over a drawing trace drawn with a pen, a change such as touch that movement of the pen is caught occurs, but in the conventional information processing system, a feeling of discomfort with a touch of pen input when the pen crosses the drawing trace may be felt.

SUMMARY

The present invention has been made to solve the above problem, and an object of the present invention is to provide an information processing system capable of reducing a feeling of discomfort in pen input and a control method.

In order to solve the above problem, according to an aspect of the present invention, there is provided an information processing system including: an information processing apparatus; and a pen configured to communicate with the information processing apparatus, in which the information processing apparatus includes a display unit configured to display a movement trace of the pen, a touch sensor unit that detects a contact position of the pen on a screen of the display unit, a display processing unit that displays, on the display unit, the movement trace on the screen with the pen that moves on the screen while making contact with the screen, based on the contact position of the pen detected by the touch sensor unit, an image transmission processing unit that transmits, to the pen, image data displayed by the display unit and including the movement trace, and a position transmission processing unit that transmits, to the pen, the contact position of the pen detected by the touch sensor unit, and the pen includes a vibration generator that outputs vibration based on a vibration waveform signal, and a vibration control unit that causes the vibration generator to output the vibration by adding a specific waveform signal to the vibration waveform signal, when a drawing object including the movement trace of the image data matches the contact position of the pen.

Further, according to an aspect of the present invention, in the information processing system, the image transmission processing unit may transmit the image data converted into a gray scale to the pen, and the vibration control unit may cause the vibration generator to output the vibration by adding the specific waveform signal to the vibration waveform signal, when a gradation value of shade in a passage section due to movement of the pen exceeds a threshold tow a black side in the image data.

Further, according to an aspect of the present invention, in the information processing system, the image transmission processing unit may periodically transmit the image data to the pen to update the image data.

Further, according to an aspect of the present invention, in the information processing system, the image transmission processing unit may periodically transmit, to the pen, partial image data including a periphery of the contact position of the pen to update the image data.

Further, according to an aspect of the present invention, in the information processing system, the pen may include an image data storage unit that stores the image data, the image transmission processing unit may transmit the image data to the pen to store the image data in the image data storage unit, and the vibration control unit may cause the vibration generator to output vibration by adding the specific waveform signal to the vibration waveform signal, when the drawing object of the image data acquired from the image data storage unit matches the contact position of the pen.

Further, according to an aspect of the present invention, there is provided a control method of an information processing system, which includes an information processing apparatus including a display unit configured to display a movement trace of the pen and a touch sensor unit that detects a contact position of the pen on a screen of the display unit, and a pen configured to communicate with the information processing apparatus and including a vibration generator that outputs vibration based on a vibration waveform signal, the control method including: a display processing step of displaying, on the display unit by the information processing apparatus, the movement trace on the screen with the pen that moves on the screen while making contact with the screen, based on the contact position of the pen detected by the touch sensor unit; an image transmission processing step of transmitting, to the pen by the information processing apparatus, image data displayed by the display unit and including the movement trace; a position transmission processing step of transmitting, to the pen by the information processing apparatus, the contact position of the pen detected by the touch sensor unit; and a vibration control step of causing, by the pen, the vibration generator to output the vibration by adding a specific waveform signal to the vibration waveform signal, when a drawing object including the movement trace of the image data matches the contact position of the pen.

According to the present invention, it is possible to reduce a feeling of discomfort in pen input.

DETAILED DESCRIPTION

Hereinafter, an information processing system and a control method according to an embodiment of the present invention will be described with reference to the drawings.

Figure 1:
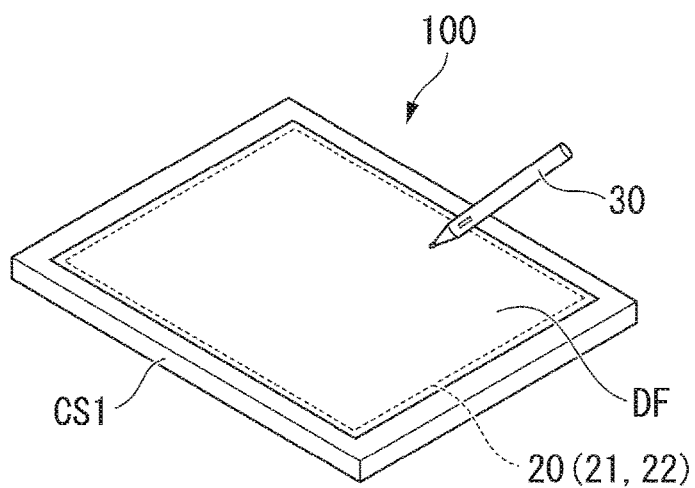
FIG. 1 is an external view illustrating an example of an information processing system according to the present embodiment.

FIG. 1 is an external view illustrating an example of an information processing system 100 according to the present embodiment.

As illustrated in FIG. 1, the information processing system 100 includes a tablet terminal 1 and a pen 30. In the present embodiment, the tablet terminal 1 will be described as an example of an information processing apparatus.

The tablet terminal 1 has a touch screen 20 installed on one main surface of a chassis CS1, and executes an application program such as a memo pad or a drawing pad using a pen 30.

The touch screen 20 includes a display unit 21 and a touch sensor unit 22, and the display unit 21 displays various information on a display screen DF.

The touch sensor unit 22 is disposed while being superimposed on the display unit 21, detects the pen 30 that makes contact with the display screen DF of the display unit 21, and detects a contact position of the pen 30.

The details of the touch screen 20, the display unit 21, and the touch sensor unit 22 will be described later.

Next, a main hardware configuration of the information processing system 100 will be described with reference to FIG. 2.

Figure 2:
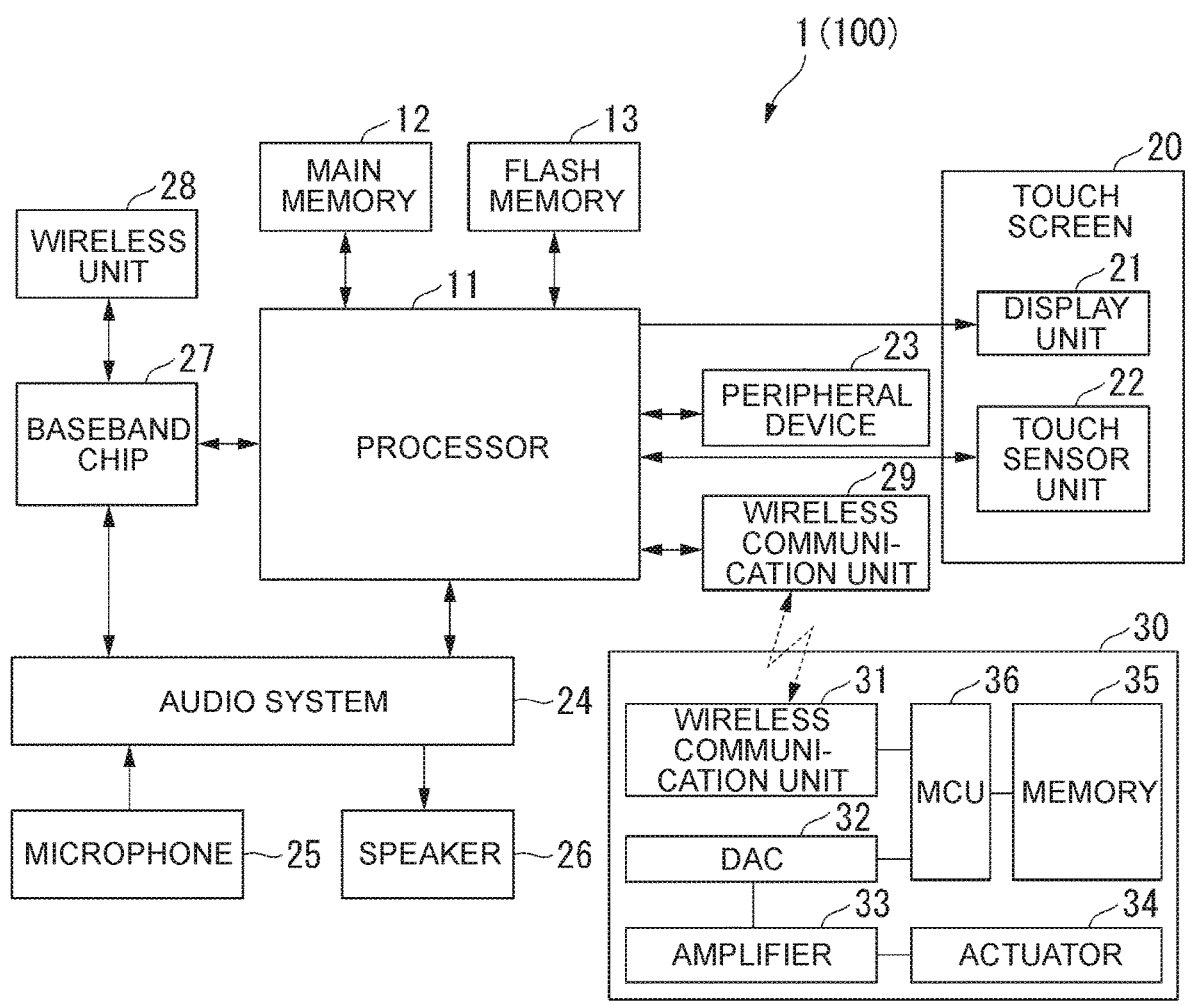
FIG. 2 is a diagram illustrating an example of a main hardware configuration of the information processing system according to the present embodiment.

FIG. 2 is a diagram illustrating an example of a main hardware configuration of the information processing system 100 according to the present embodiment.

As illustrated in FIG. 2, the information processing system 100 includes the tablet terminal 1 and the pen 30. In addition, the tablet terminal 1 includes a processor 11, a main memory 12, a flash memory 13, the touch screen 20, a peripheral device 23, an audio system 24, a microphone 25, a speaker 26, a baseband chip 27, a wireless unit 28, and a wireless communication unit 29.

The processor 11 is an application processor including, for example, a central processing unit (CPU). The processor 11 controls the entire tablet terminal 1.

The main memory 12 is a writable memory used as a reading area of the execution program of the processor 11 or as a work area for writing processing data of the execution program. The main memory 12 includes a plurality of dynamic random access memory (DRAM) chips, for example. The execution program includes operating systems (OS), various device drivers for hardware operation of peripheral equipment, various services/utilities, application programs (application software), and the like.

The flash memory 13 is, for example, a flash electrically erasable programmable read only memory (EEPROM), and stores the OS, various drivers, various services/utilities, application programs (hereinafter referred to as applications), and various data.

The display unit 21 is, for example, a liquid crystal display or an organic electro-luminescence (EL) display, and displays a display screen based on drawing data (display data) output from the processor 11. The display unit 21 can display, for example, a movement trace (drawing trace) of the pen 30.

The touch sensor unit 22 detects a position of an operation medium on a screen (display screen DF) of the display unit 21, such as the pen 30, and detects the contact of the pen 30 on the screen. The touch sensor unit 22 detects the contact position of the pen 30 on the screen of the display unit 21.

The peripheral device 23 is, for example, a wireless local area network (WLAN) module, a global positioning system (GPS) module, and sensors such as an acceleration sensor, and the like.

The audio system 24 is, for example, an audio integrated circuit (IC), and inputs, records, plays, and outputs sound data. For example, the microphone 25 and the speaker 26 are connected to the audio system 24. For example, the audio system 24 outputs the sound data collected by the microphone 25 to the processor 11 or the baseband chip 27. In addition, the audio system 24 converts, for example, the sound data acquired from the processor 11 or the baseband chip 27 into a sound signal, and outputs the sound signal to the speaker 26.

The microphone 25 collects an ambient sound from the tablet terminal 1. The microphone 25 collects sound such as user's voice when the microphone 25 blends the voice with a voice received from other terminals, for example.

The speaker 26 outputs various sounds to the outside of the tablet terminal 1. The speaker 26, for example, outputs (emits) the sound received from other terminals when the speaker 26 blends the voice with the voice received from other terminals.

The baseband chip 27 is a dedicated IC which controls a wireless communication, for example, a 4th generation mobile communication system (4G) network, a 5th generation mobile communication system (5G) network, and the like. The baseband chip 27 outputs, for example, voice data received using the wireless unit 28 to the speaker 26 via the audio system 24. In addition, the baseband chip 27 acquires, for example, the sound data collected from the microphone 25 via the audio system 24, and outputs the sound data by a mobile communication system using the wireless unit 28. In addition, the baseband chip 27 performs data communication with the processor 11 on the input/output data of the data communication over the mobile communication system.

The wireless unit 28 is a wireless communication device including an antenna for performing wireless communication over the mobile communication system.

The wireless communication unit 29 (an example of a first wireless communication unit) is, for example, a Bluetooth (registered trademark) module, and performs wireless communication with the pen 30. The wireless communication unit 29 transmits, for example, image data or contact position information on the pen 30, which will be described later, to the pen 30.

The pen 30 is a pen-shaped operation medium, and is, for example, a touch pen, a stylus pen, or the like. The pen 30 can communicate with the tablet terminal 1 by, for example, wireless communication such as Bluetooth (registered trademark). The pen 30 includes a wireless communication unit 31, a digital analog converter (DAC) 32, an amplifier 33, an actuator 34, a memory 35, and an MCU 36.

The wireless communication unit 31 (an example of a second wireless communication unit) is, for example, a Bluetooth (registered trademark) module, and performs wireless communication between the tablet terminal 1 and the pen. The wireless communication unit 31 receives, for example, the image data and the contact position information on the pen 30 from the tablet terminal 1, and supplies the received image data and the contact position information on the pen 30 to the MCU 36.

Further, the wireless communication unit 31 transmits, for example, a measured value of a contact pressure of the pen 30 by a sensor (not illustrated) to the tablet terminal 1. That is, the wireless communication unit 31 performs wireless communication with the wireless communication unit 29. In addition, the wireless communication unit 31 receives, for example, information on a vibration waveform signal output from the actuator 34 from the tablet terminal 1.

The DAC 32 converts digital data of the vibration waveform signal output from the MCU 36 into an analog signal, and outputs the analog signal to the amplifier 33 in the rear stage. The vibration waveform signal output from the MCU 36 is a waveform signal for vibration in order to reproduce a writing feeling of actual paper and a pen using the pen 30, and is a waveform signal including a specific waveform signal (for example, a pulse waveform) when the pen 30 straddles (crosses) a drawing line, which will be described later. The details of the vibration waveform signal will be described later.

The actuator 34 (an example of a vibration generator) is a generator that generates vibration using a piezoelectric vibrator such as a piezoelectric element, and outputs vibration based on the vibration waveform signal. The actuator 34 causes the pen 30 to vibrate by converting the vibration waveform signal output by the DAC 32 into the vibration.

The memory 35 includes, for example, a RAM or the like, and stores a part of a control program of the pen 30 or processing data of the MCU 36. In addition to the RAM, the memory 35 may include a flash memory, a ROM, or the like.

The micro controller unit (MCU) 36 includes a CPU, a memory such as a ROM or a RAM, an I/O related unit, and the like, and integrally controls the pen 30. The MCU 36 stores the image data received by the wireless communication unit 31 in the memory 35. In addition, the MCU 36 generates a vibration waveform signal, supplies the vibration waveform signal to the actuator 34 via the DAC 32 and the amplifier 33, and generates vibration (or sound) based on the vibration waveform signal in the actuator 34.

Next, a functional configuration of the information processing system 100 according to the present embodiment will be described with reference to FIG. 3.

Figure 3:
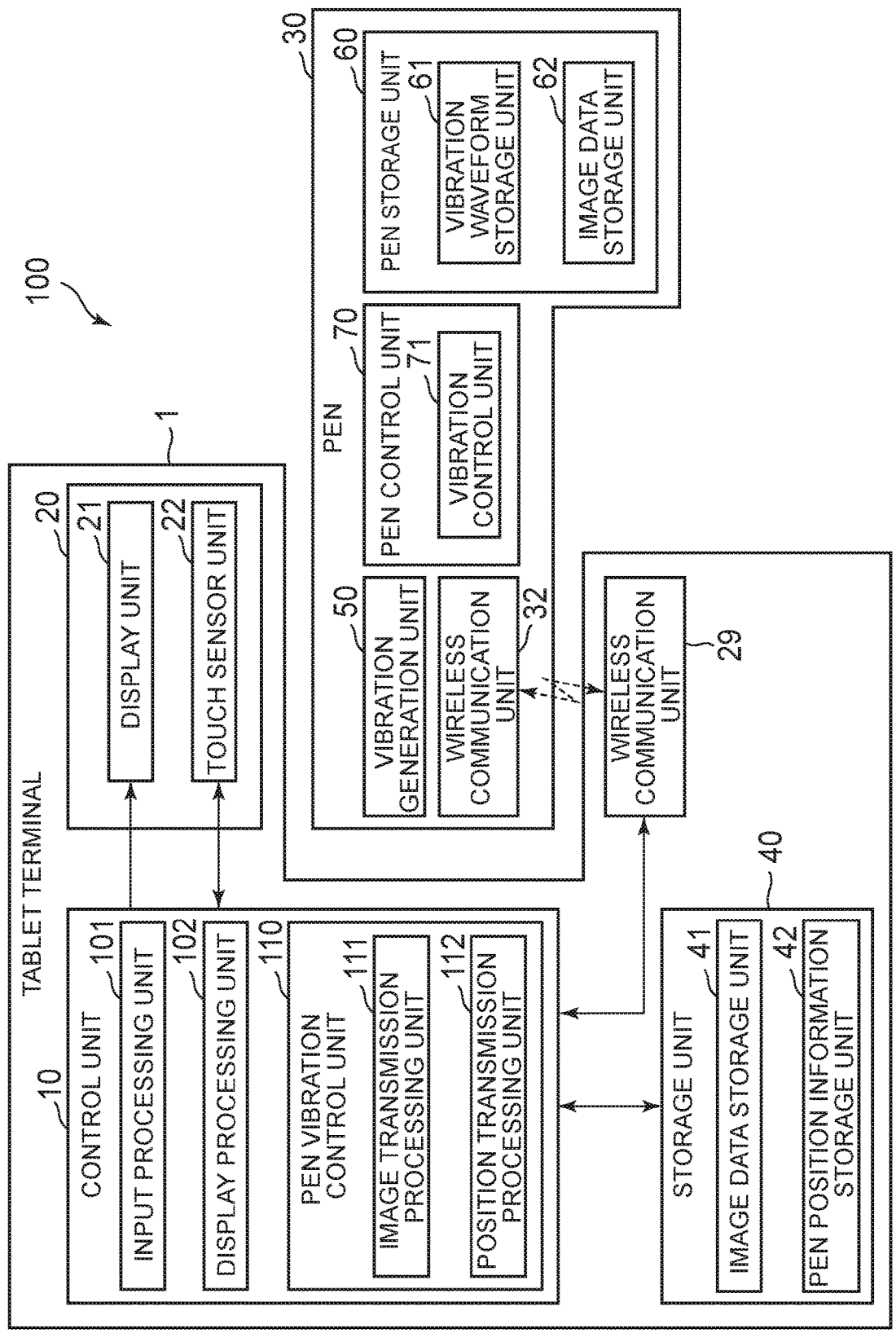
FIG. 3 is a block diagram illustrating an example of a functional configuration of the information processing system according to the present embodiment.

FIG. 3 is a block diagram illustrating an example of the functional configuration of the information processing system 100 according to the present embodiment.

As illustrated in FIG. 3, the information processing system 100 includes the tablet terminal 1 and the pen 30, and the tablet terminal 1 includes a control unit 10, the touch screen 20, a storage unit 40, and the wireless communication unit 29.

The touch screen 20 includes the display unit 21 and the touch sensor unit 22.

The touch sensor unit 22 detects the contact position of the pen 30 on the screen of the display unit 21 as pen input. The touch sensor unit 22 detects, for example, contact position information indicating two-dimensional coordinates on the display screen DF of the display unit 21 as the contact position of the pen 30. The touch sensor unit 22 outputs the contact position information to the control unit 10.

The storage unit 40 is a storage unit realized by, for example, the main memory 12 or the flash memory 13, and includes an image data storage unit 41 and a pen position information storage unit 42.

The image data storage unit 41 is, for example, a storage unit realized by the main memory 12, and stores image data obtained by capturing an image displayed on the display screen DF. The image data includes image data of the entire display screen DF (entire image data) and partial image data.

The pen position information storage unit 42 is, for example, a storage unit realized by the main memory 12, and stores the contact position information detected by the touch sensor unit 22 as pen position information. For example, the pen position information storage unit 42 stores time information and the contact position information in association with each other. The pen position information stored in the pen position information storage unit 42 is used, for example, when the movement trace of the pen 30 on the screen is displayed on the display unit 21.

The control unit 10 is, for example, a functional unit realized by the processor 11 that executes a program stored in the main memory 12 or the flash memory 13, and executes various processes based on an OS (for example, Android (registered trademark) or the like). The control unit 10 includes an input processing unit 101, a display processing unit 102, and a pen vibration control unit 110.

The input processing unit 101 is a functional unit realized by the processor 11 that executes the program stored in the main memory 12 or the flash memory 13. The input processing unit 101 is, for example, a device driver that controls input of the touch sensor unit 22, and detects the position or contact of the pen 30 on the screen (display screen DF) of the display unit 21 by the input of the touch sensor unit 22. The input processing unit 101 outputs the detected contact position information (position coordinates) of the pen 30 and the like to the OS. The contact position information detected by the input processing unit 101 is stored in the pen position information storage unit 42 by, for example, the OS.

The display processing unit 102 is a functional unit realized by the processor 11 that executes the program stored in the main memory 12 or the flash memory 13. The display processing unit 102 displays, on the display unit 21, the movement trace on the screen with the pen 30 that moves on the screen while making contact with the screen, based on the contact position of the pen 30 detected by the touch sensor unit 22. That is, the display processing unit 102 displays the movement trace of the pen 30 on the display unit 21 based on the contact position information on the pen 30 detected via the input processing unit 101. The display processing unit 102 generates a movement trace of the pen 30 based on pen position information stored by the pen position information storage unit 42, and displays the movement trace on the display unit 21.

The pen vibration control unit 110 is a functional unit realized by the processor 11 that executes the program stored in the main memory 12 or the flash memory 13, and controls the vibration of the pen 30. The pen vibration control unit 110 transmits, for example, designation information for designating the vibration waveform signal to the pen 30 via the wireless communication unit 29. In addition, the pen vibration control unit 110 transmits the image data of the captured display screen DF and the contact position information on the pen 30 to the pen 30 via the wireless communication unit 29. The pen vibration control unit 110 may be realized by an application or may be realized by a resident program resident on the OS.

The pen vibration control unit 110 includes an image transmission processing unit 111 and a position transmission processing unit 112.

The image transmission processing unit 111 is a functional unit realized by the processor 11, and transmits the image data including the movement trace of the pen 30 and displayed on the display unit 21 to the pen 30. The image transmission processing unit 111 generates image data (entire image data) obtained by periodically capturing an image displayed on the display screen DF of the display unit 21, and converts the image data into a gray scale. The image transmission processing unit 111 stores the image data converted into the gray scale in the image data storage unit 41.

The image transmission processing unit 111 transmits the image data, which is converted into the gray scale and stored by the image data storage unit 41, to the pen 30 via the wireless communication unit 29. The image transmission processing unit 111 periodically transmits the image data to the pen 30 to update the image data stored by the pen 30.

Further, when the pen 30 makes contact with the screen of the display unit 21, the image transmission processing unit 111 generates partial image data, which is obtained by capturing an image of the periphery of the pen 30, and converts the partial image data into the gray scale. The image transmission processing unit 111 stores the partial image data converted into the gray scale in the image data storage unit 41.

The image transmission processing unit 111 transmits the partial image data, which is converted into the gray scale and stored in the image data storage unit 41, to the pen 30 via the wireless communication unit 29. That is, the image transmission processing unit 111 periodically transmits the partial image data including the periphery of the contact position of the pen 30 to the pen 30 to update the partial image data stored by the pen 30.

The position transmission processing unit 112 is a functional unit realized by the processor 11, and transmits the contact position of the pen 30 detected by the touch sensor unit 22 to the pen 30. When the pen 30 makes contact with the screen of the display unit 21, the position transmission processing unit 112 transmits, for example, the most recent contact position information, which is detected by the touch sensor unit 22, to the pen 30 via the wireless communication unit 29.

The pen 30 includes the wireless communication unit 31, a vibration generation unit 50, a pen storage unit 60, and a pen control unit 70.

The vibration generation unit 50 is a functional unit realized by the DAC 32, the amplifier 33, and the actuator 34, and outputs the vibration based on the vibration waveform signal from the pen 30. The vibration generation unit 50 converts data of the vibration waveform signal output from the pen control unit 70 into an analog waveform signal by the DAC 32, amplifies the vibration waveform signal by the amplifier 33, and outputs the vibration based on the vibration waveform signal to the actuator 34.

The pen storage unit 60 is a storage unit realized by, for example, the memory 35 or the like, and stores various information used by the pen 30. The pen storage unit 60 includes a vibration waveform storage unit 61 and an image data storage unit 62.

The vibration waveform storage unit 61 is a storage unit realized by the memory 35 (for example, a flash memory, a ROM, or the like) and stores a vibration waveform signal. The vibration waveform storage unit 61 stores, for example, digital data of a basic waveform of the vibration waveform signal (basic waveform data), digital data of a specific waveform (pulse waveform) for drawing cross, which will be described later, and the like. The vibration waveform storage unit 61 may store basic waveform data of a plurality of types of vibration waveform signals according to a type of the pen 30 designated from the pen vibration control unit 110.

The image data storage unit 62 is a storage unit realized by the memory 35 (for example, RAM or the like), and stores the image data received from the tablet terminal 1 via the wireless communication unit 31. The image data stored in the image data storage unit 62 is the entire image data corresponding to a current image displayed on the screen of the display unit 21, and is image data including a drawing object of the pen 30.

The pen control unit 70 is, for example, a functional unit realized by the MCU 36, and integrally controls the pen 30. The pen control unit 70 transmits, for example, pressure information indicating a measured value of the contact pressure of a tip portion of the pen 30 detected by a sensor (not illustrated) to the tablet terminal 1 via the wireless communication unit 31. In addition, the pen control unit 70 controls the vibration of the pen 30 by the vibration generation unit 50. The pen control unit 70 includes a vibration control unit 71.

The vibration control unit 71 is a functional unit realized by the MCU 36, and controls the vibration of the pen 30 by the vibration generation unit 50. The vibration control unit 71 transmits the vibration waveform signal, which is designated from the tablet terminal 1 via the wireless communication unit 31, to the vibration generation unit 50 to vibrate the pen 30. The vibration control unit 71 acquires the basic waveform data, which is designated from the tablet terminal 1, from the vibration waveform storage unit 61 when the pen 30 is vibrated, and transmits vibration waveform data based on the basic waveform data to the vibration generation unit 50 to cause the actuator 34 to output the vibration.

Further, the vibration control unit 71 causes the actuator 34 to output the vibration by adding a specific waveform signal to the vibration waveform signal, when the drawing object including the movement trace of the image data matches the contact position of the pen 30. That is, the vibration control unit 71 outputs the vibration to the actuator 34 by adding the specific waveform signal to the vibration waveform signal, when the drawing object of the image data acquired from the image data storage unit 62 matches the contact position of the pen 30 received from the tablet terminal 1. In this case, as the waveform data of the vibration waveform signal and the waveform data of the specific waveform signal, waveform data stored in the vibration waveform storage unit 61 is used.

The vibration control unit 71 causes the actuator 34 to output the vibration by adding the specific waveform signal to the vibration waveform signal, when a gradation value of shade in a passage section due to movement of the pen 30 exceeds a threshold Th1 to a black side in the image data. In addition, the vibration control unit 71 may add the specific waveform signal to the vibration waveform signal at a point where the gradation value of shade changes rapidly. In this case, the vibration control unit 71 may add the specific waveform signal to the vibration waveform signal when a change value (difference value) of the gradation value of shade in the passage section due to movement of the pen 30 is equal to or greater than the threshold.

Next, an operation of the information processing system 100 according to the present embodiment will be described with reference to the drawing.

Figure 4:
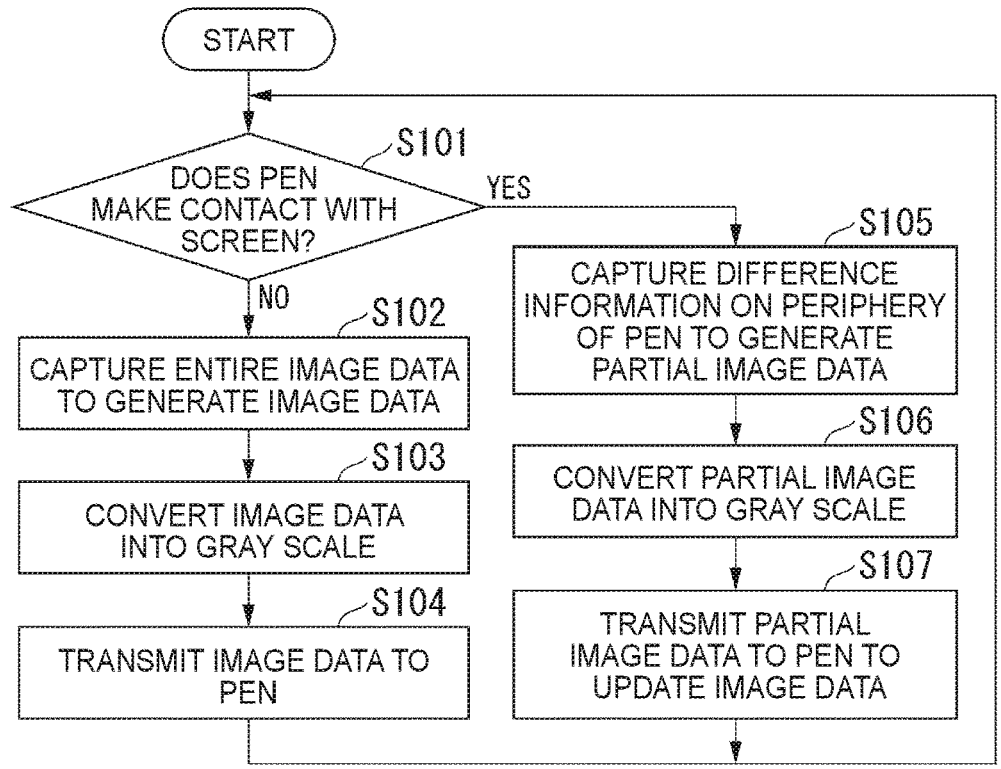
FIG. 4 is a flowchart illustrating an example of an image data transmission process of a tablet terminal according to the present embodiment.

FIG. 4 is a flowchart illustrating an example of an image data transmission process of the tablet terminal 1 according to the present embodiment.

As illustrated in FIG. 4, the tablet terminal 1 first determines whether or not the pen 30 makes contact with the screen (step S101). The image transmission processing unit 111 of the tablet terminal 1 determines whether or not the pen 30 makes contact with the screen (display screen DF), for example, by detecting the contact of the pen 30 through the touch sensor unit 22. When the image transmission processing unit 111 determines that the pen 30 makes contact with the screen (step S101: YES), the process proceeds to step S105. In addition, when the image transmission processing unit 111 determines that the pen 30 does not make contact with the screen (step S101: NO), the process proceeds to step S102.

In step S102, the image transmission processing unit 111 captures the entire screen to generate image data. That is, the image transmission processing unit 111 captures the entire display screen DF to generate the entire image data.

Next, the image transmission processing unit 111 converts the image data into a gray scale (step S103). The image transmission processing unit 111 converts the entire image data into a dark gray scale of black and white, and stores the image data converted into the gray scale in the image data storage unit 41.

Next, the image transmission processing unit 111 transmits the image data to the pen 30 (step S104). The image transmission processing unit 111 transmits the image data (entire image data), which is converted into the gray scale and stored in the image data storage unit 41, to the pen 30 through wireless communication via the wireless communication unit 29. After the process of step S104, the image transmission processing unit 111 returns the process to step S101.

As described above, the image transmission processing unit 111 periodically transmits the image data to the pen 30 through wireless communication via the wireless communication unit 29, and stores the image data of the pen 30 in the image data storage unit 62.

Further, in step S105, the image transmission processing unit 111 captures difference information on the periphery of the pen 30 to generate partial image data. That is, the image transmission processing unit 111 generates partial image data of the changed part of the periphery of the pen 30.

Next, the image transmission processing unit 111 converts the partial image data into a gray scale (step S106). The image transmission processing unit 111 converts the partial image data into a dark gray scale of black and white, and stores the partial image data converted into the gray scale in the image data storage unit 41.

Next, the image transmission processing unit 111 transmits the partial image data to the pen 30 to update the image data (step S107). The image transmission processing unit 111 transmits the partial image data, which is converted into the gray scale and stored in the image data storage unit 41, to the pen 30 through wireless communication via the wireless communication unit 29 by adding position information on the partial image data. After the process of step S107, the image transmission processing unit 111 returns the process to step S101.

As described above, when the pen 30 makes contact with the screen, the image transmission processing unit 111 periodically transmits the partial image data to the pen 30 through wireless communication via the wireless communication unit 29, to update the entire image data stored in the image data storage unit 62 of the pen 30 using the partial image data.

Next, image data according to the present embodiment will be described with reference to FIG. 5.

Figure 5:
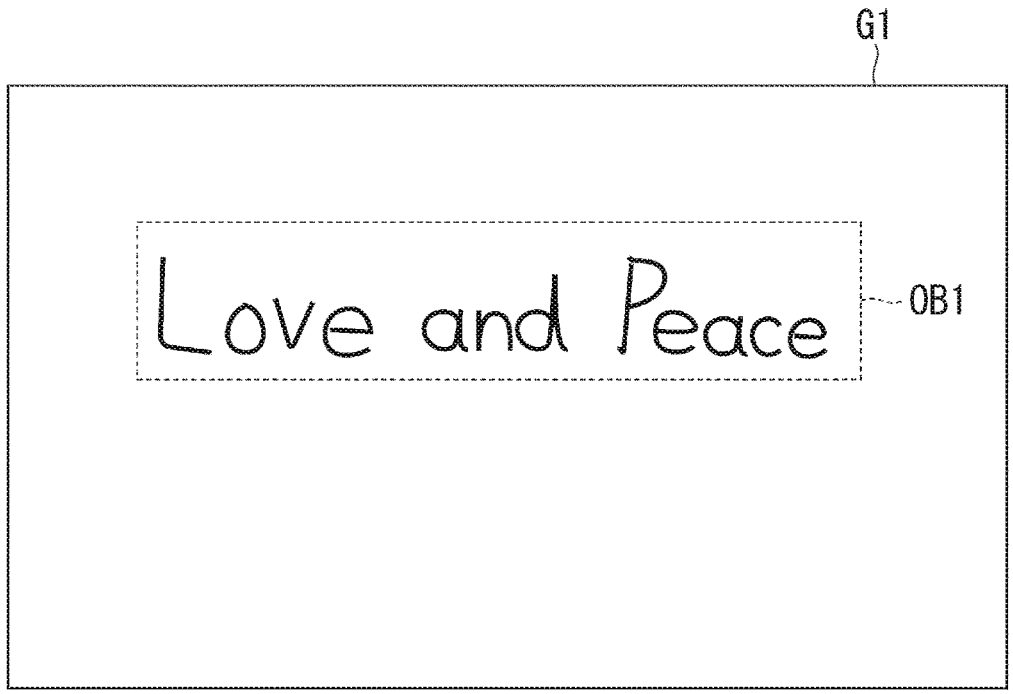
FIG. 5 is a view illustrating an example of image data according to the present embodiment.

FIG. 5 is a view illustrating an example of image data according to the present embodiment.

The image transmission processing unit 111 captures the display screen DF to generate image data G1 as illustrated in FIG. 5.

In the example illustrated in FIG. 5, the image data G1 includes a drawing called "Love and Peace" that is handwritten by the pen 30 as a drawing object OB1. The image data G1 is, for example, bit map (BMP) data corresponding to a size of the display screen DF.

Next, a process of the pen 30 on an image data receiving side will be described with reference to FIG. 6.

Figure 6:
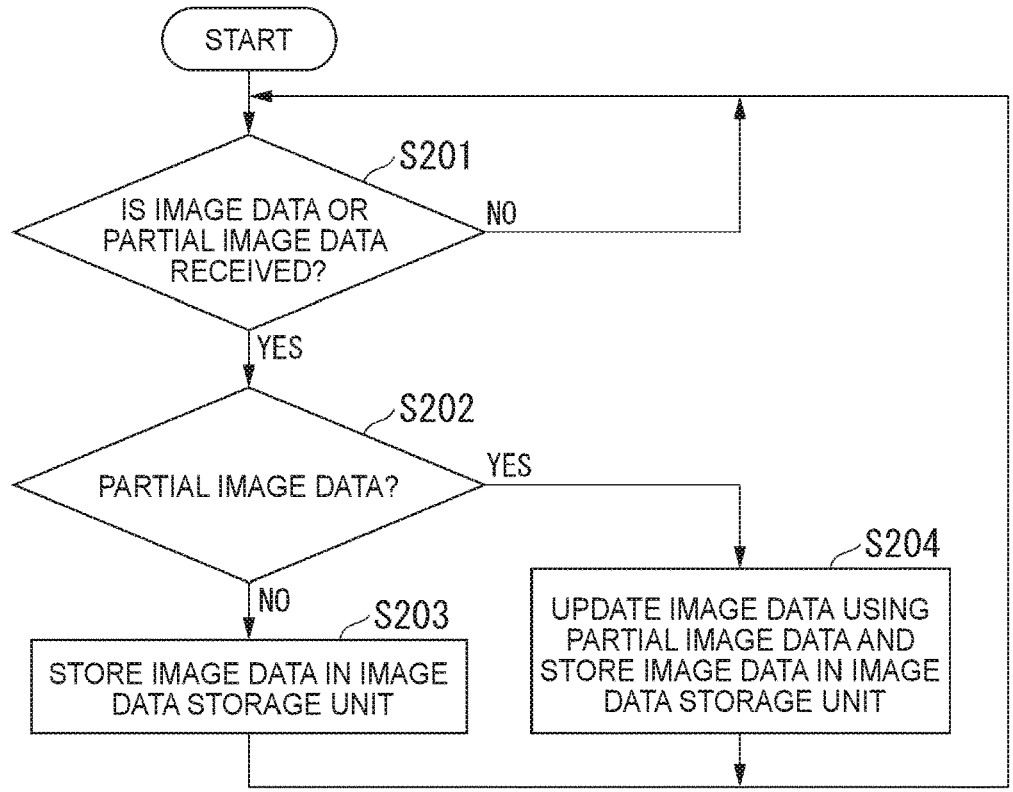
FIG. 6 is a flowchart illustrating an example of an image data reception process of a pen according to the present embodiment.

FIG. 6 is a flowchart illustrating an example of an image data reception process of the pen 30 according to the present embodiment.

As illustrated in FIG. 6, the pen control unit 70 (vibration control unit 71) of the pen 30 determines whether or not the image data or partial image data is received (step S201). The pen control unit 70 determines whether or not the image data or partial image data is received from the tablet terminal 1 by the wireless communication unit 31. When the pen control unit 70 determines that the image data or the partial image data is received (step S201: YES), the process proceeds to step S202. In addition, when the pen control unit 70 determines that the image data or the partial image data is not received (step S201: NO), the process returns to step S201.

In step S202, the pen control unit 70 (vibration control unit 71) determines whether or not the received image data is partial image data. When the pen control unit 70 determines that the received image data is partial image data (step S202: YES), the process proceeds to step S204. When the pen control unit 70 determines that the received image data is not partial image data (step S202: NO), the process proceeds to step S203.

In step S203, the pen control unit 70 (vibration control unit 71) stores the image data in the image data storage unit 62. The pen control unit 70 stores the received entire image data in the image data storage unit 62, and updates the image data (entire image data). After the process of step S203, the process of the pen control unit 70 returns to step S201.

Further, in step S204, the pen control unit 70 (vibration control unit 71) updates the image data using the partial image data, and stores the image data in the image data storage unit 62. The pen control unit 70 replaces a part of the image data (entire image data) stored in the image data storage unit 62 based on the position information given to the partial image data, updates the image data (entire image data), and stores the updated image data (entire image data) in the image data storage unit 62.

As described above, the pen 30 periodically updates the image data (entire image data) stored in the image data storage unit 62 using the image data (or partial image data) received from the tablet terminal 1.

Next, a pen input process of the tablet terminal 1 according to the present embodiment will be described with reference to FIG. 7.

Figure 7:
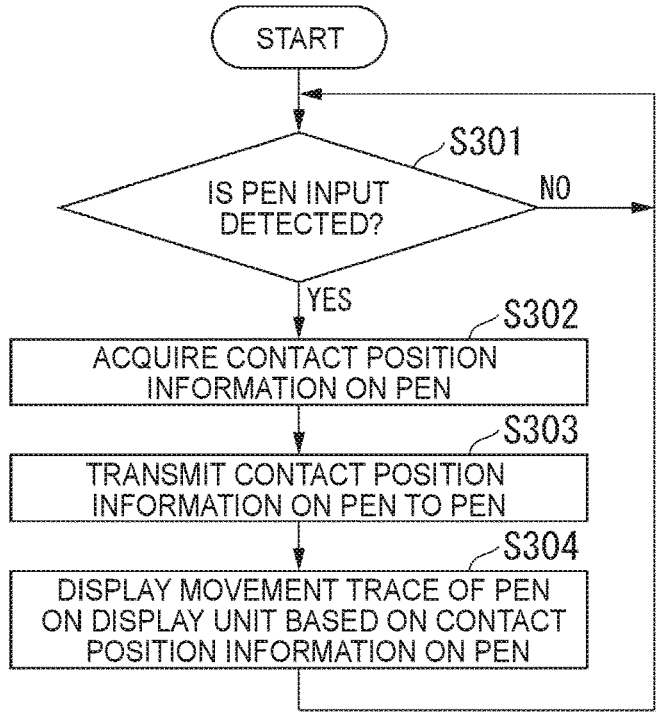
FIG. 7 is a flowchart illustrating an example of a pen input process of the tablet terminal according to the present embodiment.

FIG. 7 is a flowchart illustrating an example of a pen input process of the tablet terminal 1 according to the present embodiment.

As illustrated in FIG. 7, the input processing unit 101 of the tablet terminal 1 determines whether or not the pen input is detected (step S301). The input processing unit 101 determines whether or not the pen input is detected by the touch sensor unit 22. When the input processing unit 101 determines that the pen input is detected (step S301: YES), the process proceeds to step S302. In addition, when the input processing unit 101 determines that the pen input is not detected (step S301: NO), the process returns to step S301.

In step S302, the input processing unit 101 acquires contact position information on the pen 30. The input processing unit 101 acquires the contact position information from the touch sensor unit 22 and stores the contact position information in the pen position information storage unit 42.

Next, the position transmission processing unit 112 of the tablet terminal 1 transmits the contact position information on the pen 30 to the pen 30 (step S303). The position transmission processing unit 112 transmits the contact position information on the pen 30 to the pen 30 through wireless communication via the wireless communication unit 29.

Next, the display processing unit 102 of the tablet terminal 1 displays the movement trace of the pen 30 on the display unit 21 based on the contact position information on the pen 30 (step S304). The display processing unit 102 displays, on the display unit 21, the movement trace of the pen 30 on the screen, for example, based on the contact position information on the pen 30 stored in the pen position information storage unit 42. After the process of step S304, the process of the display processing unit 102 returns to step S301.

Next, a vibration output process of the pen 30 according to the present embodiment will be described with reference to FIG. 8.

Figure 8:
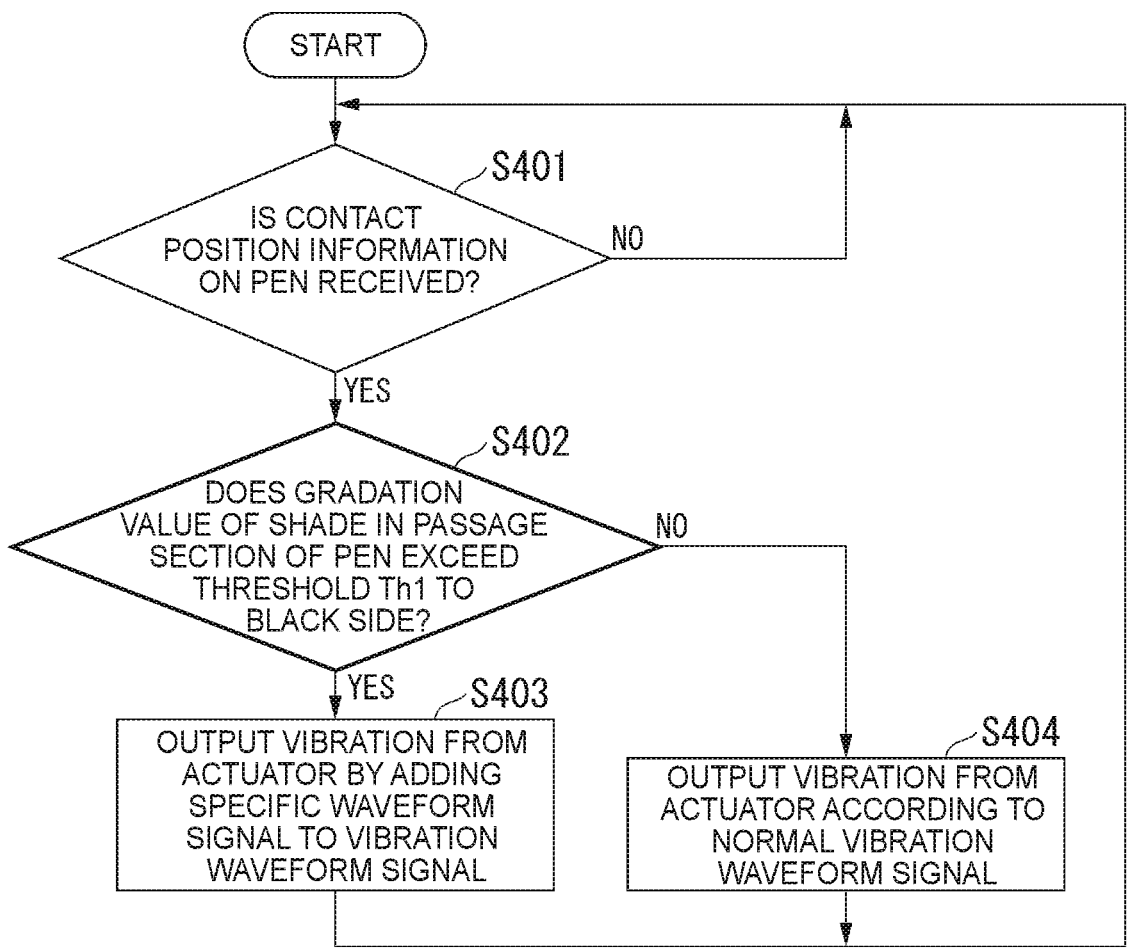
FIG. 8 is a flowchart illustrating an example of a vibration output process of the pen according to the present embodiment.

FIG. 8 is a flowchart illustrating an example of the vibration output process of the pen 30 according to the present embodiment.

As illustrated in FIG. 8, the vibration control unit 71 of the pen 30 first determines whether or not the contact position information on the pen 30 is received (step S401). The vibration control unit 71 determines whether or not the wireless communication unit 31 receives the contact position information on the pen 30 from the tablet terminal 1. When the vibration control unit 71 determines that the contact position information on the pen 30 is received (step S401: YES), the process proceeds to step S402. In addition, when the vibration control unit 71 determines that the contact position information on the pen 30 is not received (step S401: NO), the process returns to step S401.

In step S402, the vibration control unit 71 determines whether or not the gradation value of shade in the passage section of the pen 30 exceeds the threshold Th1 to a black side (dark side). When the vibration control unit 71 determines that the gradation value of shade exceeds the threshold Th1 to the black side (dark side) (step S402: YES), the process proceeds to step S403. In addition, when the vibration control unit 71 determines that the gradation value of shade does not exceed the threshold Th1 to the black side (dark side) (step S402: NO), the process proceeds to step S404.

In step 403, the vibration control unit 71 outputs the vibration from the actuator 34 by adding the specific waveform signal to the vibration waveform signal. The vibration control unit 71 outputs the vibration from the actuator 34 by the vibration generation unit 50 by adding (superimposing) the specific waveform signal (pulse waveform) stored in the vibration waveform storage unit 61 to the vibration waveform signal stored in the vibration waveform storage unit 61 based on the designated basic waveform data. After the process of step S403, the process of the vibration control unit 71 returns to step S401.

Further, in step 404, the vibration control unit 71 outputs the vibration from the actuator 34 according to a normal vibration waveform signal. The vibration control unit 71 outputs the vibration from the actuator 34 by the vibration generation unit 50 with the normal vibration waveform signal stored in the vibration waveform storage unit 61 based on the designated basic waveform data. After the process of step S404, the process of the vibration control unit 71 returns to step S401.

Next, a specific example of a vibration output process of the information processing system 100 according to the present embodiment will be described with reference to FIGS. 9A-9C.

Figure 9A:
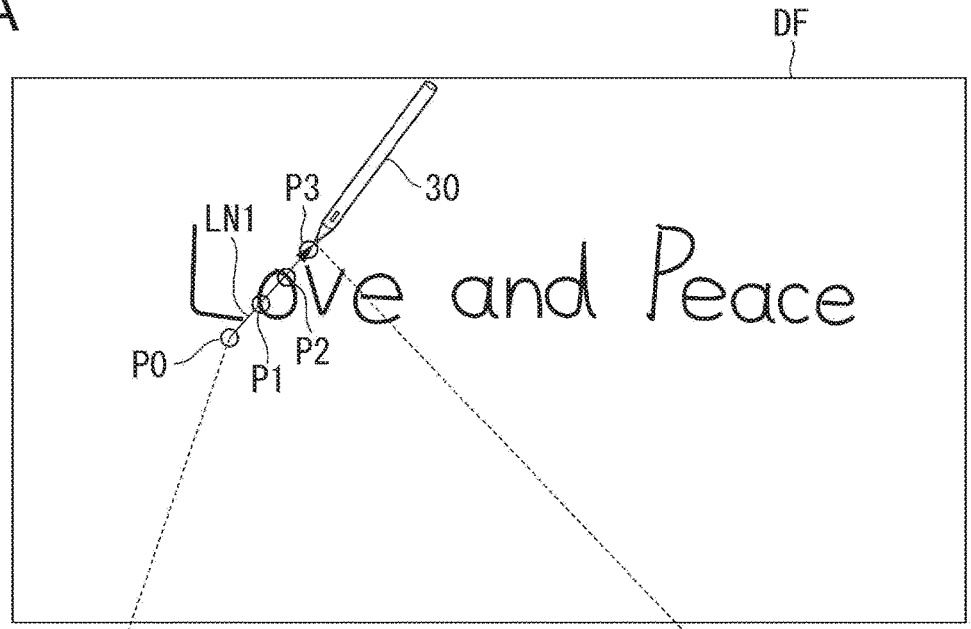
FIGS. 9A-9C are diagrams illustrating an example of a vibration output process of the information processing system according to the present embodiment.
Figure 9B:
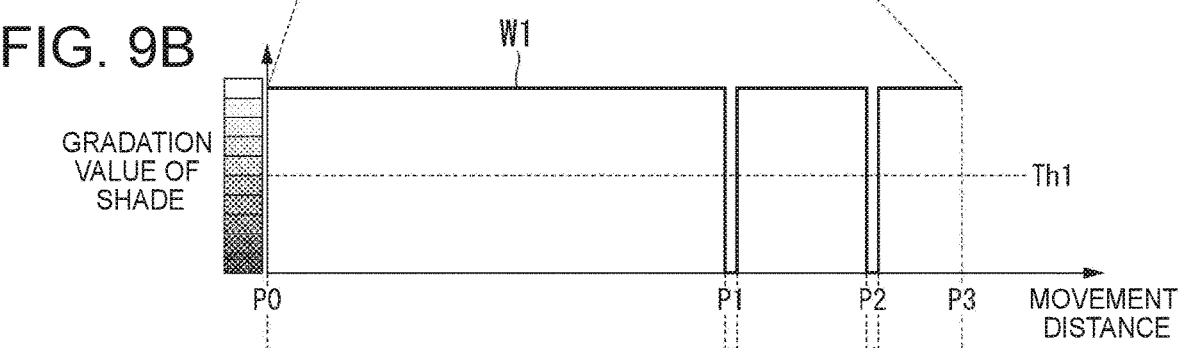
Figure 9C:
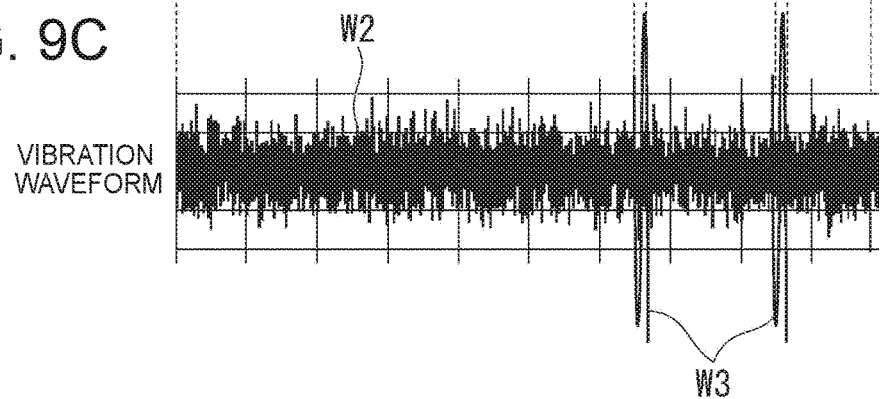

FIGS. 9A-9C are diagrams illustrating an example of the vibration output process of the information processing system 100 according to the present embodiment.

FIG. 9A illustrates an example when the pen 30 moves from a position P0 to a position P3 while making contact with the screen in a state where the above-described image data G1 illustrated in FIG. 5 is displayed on the display screen DF.

Further, FIG. 9B illustrates a change in the gradation value of shade in the passage section when the pen 30 moves from the position P0 to the position P3. In FIG. 9B, a vertical axis of a graph represents a gradation value of shade, and a horizontal axis of the graph represents a movement distance. In addition, a waveform W1 represents a change in the gradation value of shade.

Further, FIG. 9C illustrates a vibration waveform output to the actuator 34 by the pen 30. In FIG. 9C, a waveform W2 represents a normal vibration waveform, and a waveform W3 represents a specific vibration waveform (pulse waveform) to be added.

In the example illustrated in FIGS. 9A-9C, an example is illustrated when the pen 30 draws an ink line LN1 while passing through "o" of the handwritten drawing "Love", which is the drawing object OB1 of the image data G1. In this case, a drawing line of "o" is intersected (crossed) between the position P0 and the position P3 of the ink line LN1 at positions P1 and P2.

In this case, as illustrated in the waveform W1 of FIG. 9B, the change in the gradation value of shade is changed to a black gradation value at the position P1 by continuing a white gradation value from the position P0. In addition, after passing through the position P1, the white gradation value is continued again to change the same into the black gradation value at the position P2. In addition, after passing through the position P1, the white gradation value is continued again.

In this case, as illustrated in the waveform W2 of FIG. 9C, the vibration control unit 71 outputs a vibration waveform of the waveform W2 to the actuator 34 within a period between the position P0 and the position P1, a period between the position P1 and the position P2, and period between the position P2 and the position P3. In addition, since the gradation value exceeds the threshold Th1 to the black side as illustrated in the waveform W1 in the position P1 and the position P2, the vibration control unit 71 causes the actuator 34 to output a waveform which is obtained by adding a specific vibration waveform (pulse waveform) of the waveform W3 to the waveform W2.

As described above, the information processing system 100 according to the present embodiment includes the tablet terminal 1 (information processing apparatus) and the pen 30 that can communicate with the tablet terminal 1. The tablet terminal 1 includes the display unit 21, the touch sensor unit 22, the display processing unit 102, the image transmission processing unit 111, and the position transmission processing unit 112. The display unit 21 can display the movement trace (drawing trace) of the pen 30. The touch sensor unit 22 detects the contact position of the pen 30 on the screen of the display unit 21. The display processing unit 102 displays, on the display unit 21, the movement trace on the screen with the pen 30 that moves on the screen while making contact with the screen, based on the contact position of the pen 30 detected by the touch sensor unit 22. The image transmission processing unit 111 transmits the image data displayed by the display unit 21 and including the movement trace to the pen 30. The position transmission processing unit 112 transmits the contact position of the pen 30 detected by the touch sensor unit 22 to the pen 30. In addition, the pen 30 includes the actuator 34 (vibration generator) and the vibration control unit 71. The actuator 34 outputs the vibration based on the vibration waveform signal. The vibration control unit 71 outputs the vibration to the actuator 34 by adding a specific waveform signal to the vibration waveform signal, when the drawing object (for example, the drawing object OB1 or the like illustrated in FIG. 5) including the movement trace of the image data matches the contact position of the pen 30.

Accordingly, when the drawing object of the image data matches the contact position of the pen 30, since the vibration is output to the actuator 34 by adding the specific waveform signal to the vibration waveform signal, the information processing system 100 according to the present embodiment can output the appropriate vibration, for example, when the pen 30 crosses the drawing trace. Therefore, the information processing system 100 according to the present embodiment can reduce a feeling of discomfort with a touch of pen input when the pen 30 crosses the drawing trace.

In the information processing system 100 according to the present embodiment, the vibration control unit 71 on the pen 30 side determines a timing at which the pen 30 crosses the drawing trace to output the vibration to the actuator 34 by adding the specific waveform signal to the vibration waveform signal. For example, when the timing at which the pen 30 crosses the drawing trace is determined on the tablet terminal 1 side, an instruction to switch the vibration waveform signal needs to be transmitted to the pen 30 after the timing at which the pen 30 crosses the drawing trace is determined on the tablet terminal 1 side. Therefore, when the timing at which the pen 30 crosses the drawing trace is determined on the tablet terminal 1 side, a delay (time lag) is generated until switching the vibration waveform signal, and it is difficult to switch the vibration waveform signal at the timing at which the pen 30 crosses the drawing trace.

On the other hand, in the information processing system 100 according to the present embodiment, the vibration control unit 71 on the pen 30 side determines the timing at which the pen 30 crosses the drawing trace, so that the delay (time lag) until the vibration waveform signal is switched can be reduced, and the pen 30 can generate vibration with the reduced feeling of discomfort.

Further, in the present embodiment, the image transmission processing unit 111 transmits the image data converted into gray scale to the pen 30. When the gradation value of shade in the passage section due to movement of the pen 30 exceeds the threshold Th1 to the black side in the image data, the vibration control unit 71 causes the actuator 34 to output the vibration by adding the specific waveform signal (for example, the waveform W3 in FIGS. 9A-9C) to the vibration waveform signal (for example, the waveform W2 in FIGS. 9A-9C) (see FIGS. 9A-9C).

Accordingly, the information processing system 100 according to the present embodiment determines that the gradation value of shade exceeds the threshold Th1 to the black side, so that it is possible to easily and appropriately determine that the drawing object (for example, the drawing object OB1 or the like illustrated in FIG. 5) matches the contact position of the pen 30 (that the pen 30 crosses the drawing trace).

Further, in the present embodiment, the image transmission processing unit 111 periodically transmits the image data (entire image data) to the pen 30 to update the image data (entire image data).

As a result, the information processing system 100 according to the present embodiment periodically transmits the image data (entire image data) to the pen 30 to update the image data (entire image data), so that it is possible to appropriately determine the timing at which the pen 30 crosses the drawing trace, for example.

Further, in the present embodiment, the image transmission processing unit 111 periodically transmits the partial image data including the periphery of the contact position of the pen 30 to the pen 30 to update the image data (entire image data). That is, when the pen 30 makes contact with the display screen DF of the display unit 21, the image transmission processing unit 111 transmits the partial image data including the periphery of the contact position of the pen 30 to the pen 30 to update the image data (entire image data).

Accordingly, the information processing system 100 according to the present embodiment periodically transmits the partial image data including the periphery of the contact position of the pen 30 to the pen 30, so that it is possible to reduce a processing load and a communication load for updating the image data (entire image data).

In the information processing system 100 according to the present embodiment, by transmitting the partial image data including the periphery of the contact position of a pen 30 to the pen 30, the image data can be more appropriately updated, for example, when there is a plurality of types of pens 30, when drawing is performed using stamps, or the like such as when there are different thicknesses of the drawing lines of the pen 30 or the like, and a feeling of discomfort with a touch of pen input can be more appropriately reduced.

Further, in the present embodiment, the pen 30 includes the image data storage unit 62 that stores the image data. The image transmission processing unit 111 transmits the image data to the pen 30 and stores the image data in the image data storage unit 62. The vibration control unit 71 causes the actuator 34 to output the vibration by adding a specific waveform signal to the vibration waveform signal, when the drawing object of the image data acquired from the image data storage unit 62 matches the contact position of the pen 30.

Accordingly, the information processing system 100 according to the present embodiment includes the image data storage unit 62, so that it is possible to appropriately store the image data in the pen 30, to more appropriately update the image data, and to more appropriately reduce a feeling of discomfort with a touch of pen input.

Further, in the present embodiment, the tablet terminal 1 includes the wireless communication unit 29 (first wireless communication unit), and the pen 30 includes the wireless communication unit 31 (second wireless communication unit). The image transmission processing unit 111 and the position transmission processing unit 112 transmit, from the tablet terminal 1 to the pen 30, the image data and the contact position information through wireless communication between the wireless communication unit 29 (first wireless communication unit) and the wireless communication unit 31 (second wireless communication unit).

Accordingly, the information processing system 100 according to the present embodiment transmits the image data and the contact position information from the tablet terminal 1 to the pen 30 through wireless communication, so that it is not necessary to connect the pen 30 to the tablet terminal 1 by wire. Therefore, the information processing system 100 according to the present embodiment can enhance a degree of freedom in operation of the pen 30 and can improve usability of the pen 30.

Further, a control method according to the present embodiment is a control method of the information processing system 100 including the tablet terminal 1 including the display unit 21 that can display the movement trace of the pen 30 and the touch sensor unit 22 that detects the contact position of the pen 30 on the screen of the display unit 21, and the pen 30 having an actuator 34 that can communicate with the tablet terminal 1 and outputs the vibration based on the vibration waveform signal, in which the control method includes a display processing step, an image transmission processing step, a position transmission processing step, and a vibration control step. In the display processing step, the tablet terminal 1 displays, on the display unit 21, the movement trace on the screen with the pen 30 that moves on the screen while making contact with the screen, based on the contact position of the pen 30 detected by the touch sensor unit 22. In the image transmission processing step, the tablet terminal 1 transmits the image data including the movement trace and displayed by the display unit 21 to the pen 30. In the position transmission processing step, the tablet terminal 1 transmits the contact position of the pen 30 detected by the touch sensor unit 22 to the pen 30. In the vibration control step, the pen 30 causes the actuator 34 to output the vibration by adding a specific waveform signal to the vibration waveform signal, when the drawing object including the movement trace of the image data matches the contact position of the pen 30.

Accordingly, the control method according to the present embodiment exhibits the same effects as the information processing system 100 described above, and can reduce a feeling of discomfort with a touch of pen input when the pen 30 crosses the drawing trace.

The present invention is not limited to the embodiments described above and can be changed without departing from the gist of the present invention.

For example, in the embodiments described above, an example in which the information processing apparatus is the tablet terminal 1 has been described, but the present embodiment is not limited thereto. The information processing apparatus may be, for example, a smartphone or a laptop PC including a tablet mode.

Further, in each embodiment described above, an example in which Android (registered trademark) is used as an example of the OS used, but the present embodiment is not limited thereto and may be applied to, for example, another OS such as an iOS (registered trademark).

Further, in each embodiment described above, an example in which the vibration generator is the actuator 34 has been described, but the present embodiment is not limited thereto and may be, for example, another device such as a speaker for outputting sound. In addition, the actuator 34 and the speaker may be used in combination as the vibration generator.

Further, in each embodiment described above, an example in which the wireless communication unit 29 and the wireless communication unit 31 use Bluetooth (registered trademark) as wireless communication have been described, but the present embodiment is not limited thereto and may use other types of wireless communication. In addition, the communication between the tablet terminal 1 and the pen 30 may use wired communication instead of the wireless communication.

Further, in each embodiment described above, an example in which the vibration control unit 71 adds (superimposes) the specific waveform signal (pulse waveform) when the gradation value of shade exceeds the threshold Th1 to the black side has been described, but the present embodiment is not limited thereto and may add or generate, for example, the specific waveform signal (pulse waveform) having a level based on an amount of variation in color.

The inside of each configuration of the above-described information processing system 100 is provided with a computer system. The process in each configuration of the information processing system 100 described above may be performed by recording a program for realizing the functions of each configuration included in the above-described information processing system 100 on a computer-readable recording medium and reading and executing the program recorded on the recording medium with a computer system. The expression "reading and executing the program recorded on the recording medium with the computer system" herein includes installing the program in the computer system. The expression "computer system" as stated herein includes hardware such as an OS and peripheral equipment.

The "computer system" may include a plurality of computer devices connected via a network including a communication line such as the Internet, a WAN, a LAN, and a dedicated line. The "computer-readable recording medium" is a portable medium such as a flexible disk, a magneto-optical disk, a ROM, or a CD-ROM, and a storage device such as a hard disk built into the computer system. As described above, the recording medium that stores the program may be a non-transitory recording medium such as a CD-ROM.

The recording medium also includes an internal or external recording medium accessible from a distribution server in order to distribute the program. The program may be divided into a plurality of programs, downloaded at different timings, and then combined with each configuration included in the information processing system 100, or distribution servers for distributing the respective divided programs may be different. The "computer-readable recording medium" includes a medium that stores the program for a certain period of time, such as a volatile memory (RAM) inside a computer system that serves as a server or a client in a case where the program is transmitted via a network. The above program may be a program for realizing some of the above functions. The program may be a so-called difference file (difference program) in which the above functions can be realized in combination with a program already recorded in the computer system.

Further, a part or all of the above-described functions may be realized as an integrated circuit such as a large scale integration (LSI). Each function described above may be individually realized as a processor, and a part or all of the functions may be integrated into a processor. A method of forming an integrated circuit is not limited to the LSI, and may be realized by a dedicated circuit or a general-purpose processor. In a case where an integrated circuit technology that replaces an LSI will appear due to advances in semiconductor technology, an integrated circuit based on the technology may be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 1 tablet terminal
10 control unit
11 processor
12 main memory
13 flash memory
20 touch screen
21 display unit
22 touch sensor unit
23 peripheral device
24 audio system
25 microphone
26 speaker
27 baseband chip
28 wireless unit
29, 31 wireless communication unit
30 pen
32 DAC
33 amplifier
34 actuator
35 memory
36 MCU
40 storage unit
41, 62 image data storage unit
42 pen position information storage unit
50 vibration generation unit
60 pen storage unit
61 vibration waveform storage unit
70 pen control unit
71 vibration control unit
100 information processing system
101 input processing unit
102 display processing unit
110 pen vibration control unit
111 image transmission processing unit
112 position transmission processing unit

What is claimed is:

1. An information processing system comprising:
an information processing apparatus; and
a pen configured to communicate with the information processing apparatus, wherein
the information processing apparatus comprises:
a display unit configured to display a movement trace of the pen,
a touch sensor unit that detects a contact position of the pen on a screen of the display unit,
a display processing unit that displays, on the display unit, the movement trace on the screen with the pen that moves on the screen while making contact with the screen, based on the contact position of the pen detected by the touch sensor unit,
an image transmission processing unit that transmits, to the pen, image data displayed by the display unit and including the movement trace, and
a position transmission processing unit that transmits, to the pen, the contact position of the pen detected by the touch sensor unit, and
the pen comprises:
a vibration generator that outputs vibration based on a vibration waveform signal; and
a vibration control unit, wherein
in response to the touch sensor unit detecting, based on the image data, that the contact position of the pen has crossed a region of a displayed image having a gradation value higher than a threshold, the vibration control unit causes the vibration generator to output the vibration by adding a specific waveform signal to the vibration waveform signal, wherein
the specific waveform signal causes the pen to reproduce a writing touch on paper in response to a touch on the screen.

2. The information processing system according to claim 1, wherein
the image transmission processing unit transmits the image data converted into a gray scale to the pen.

3. The information processing system according to claim 1, wherein
the image transmission processing unit periodically transmits the image data to the pen to update the image data.

4. The information processing system according to claim 1, wherein
the image transmission processing unit periodically transmits, to the pen, partial image data including a periphery of the contact position of the pen to update the image data.

5. The information processing system according to claim 1, wherein
the pen includes an image data storage unit that stores the image data,
the image transmission processing unit transmits the image data to the pen to store the image data in the image data storage unit, and
the vibration control unit causes the vibration generator to output the vibration by adding the specific waveform signal to the vibration waveform signal based on the image data stored in the image data storage unit.

6. The information processing system according to claim 1, wherein
the vibration control unit causes the vibration generator to output vibrations by adding the specific waveform signal to a plurality of types of vibration waveform signals such that writing touches are reproduced respectively corresponding to types of pens.

7. A control method of an information processing system which includes an information processing apparatus including a display unit configured to display a movement trace of a pen and a touch sensor unit that detects a contact position of the pen on a screen of the display unit, and a pen configured to communicate with the information processing apparatus and including a vibration generator that outputs vibration based on a vibration waveform signal, the control method comprising:

- a display processing step of displaying, on the display unit by the information processing apparatus, the movement trace on the screen with the pen that moves on the screen while making contact with the screen, based on the contact position of the pen detected by the touch sensor unit;
- an image transmission processing step of transmitting, to the pen by the information processing apparatus, image data displayed by the display unit and including the movement trace;
- a position transmission processing step of transmitting, to the pen by the information processing apparatus, the contact position of the pen detected by the touch sensor unit; and
- a vibration control step of, in response to the touch sensor unit detecting, based on the image data, that the contact position of the pen has crossed a region of a displayed image having a gradation value higher than a threshold, causing the vibration generator to output the vibration by adding a specific waveform signal to the vibration waveform signal, wherein
  - the specific waveform signal causes the pen to reproduce a writing touch on paper in response to a touch on the screen.

* * * * *